United States Patent [19]
Pun

[11] Patent Number: 6,125,333
[45] Date of Patent: Sep. 26, 2000

[54] BUILDING BLOCK APPROACH FOR FATIGUE SPECTRA GENERATION

[75] Inventor: Adarsh Kumar Pun, Rancho Palos Verdes, Calif.

[73] Assignee: Northrop Grumman Corporation, Los Angeles, Calif.

[21] Appl. No.: 08/965,599

[22] Filed: Nov. 6, 1997

[51] Int. Cl.[7] .................................................. B64D 47/00
[52] U.S. Cl. ......................................... 702/42; 244/117 R
[58] Field of Search ........................ 395/500.28; 73/802; 244/117 R; 702/42, 33, 34, 43, 35

[56] References Cited

U.S. PATENT DOCUMENTS

| | | |
|---|---|---|
| 3,755,300 | 8/1973 | Fleury . |
| 3,979,949 | 9/1976 | Smith . |
| 4,336,595 | 6/1982 | Adams et al. . |
| 4,453,413 | 6/1984 | Schneider . |
| 4,480,480 | 11/1984 | Scott et al. . |
| 4,858,146 | 8/1989 | Shebini . |
| 4,947,341 | 8/1990 | Shine . |
| 5,065,630 | 11/1991 | Hadcock et al. . |
| 5,402,366 | 3/1995 | Kihara et al. . |
| 5,511,430 | 4/1996 | Delest et al. ............................. 73/802 |
| 5,641,133 | 6/1997 | Toossi ................................. 244/17.27 |
| 5,816,530 | 10/1998 | Grube ..................................... 244/1 R |
| 5,907,487 | 5/1999 | Rosenberg et al. .................... 364/190 |

*Primary Examiner*—Timothy P. Callahan
*Assistant Examiner*—Linh Nguyen
*Attorney, Agent, or Firm*—Terry J. Anderson; Karl J. Hoch, Jr.

[57] ABSTRACT

The present invention is embodied in an apparatus and method for generating fatigue spectra on a chosen aircraft for which a Finite element model is available and for which a library of external load summations at key interfaces and key fundamental parameters are available from an aeroelastic analysis. The fatigue spectra generation system of the present invention represents a profile of stresses endured by the aircraft due to numerous events, such as ground and maneuver events, occurring during the life of the aircraft. The system calculates a total stress based on load and unit conditions associated with outside events by factoring up the unit conditions to derive individual stresses for each event and by summing all unit conditions.

20 Claims, 6 Drawing Sheets

BUILDING BLOCK APPROACH FOR FATIGUE SPECTRA GENERATION

BACKGROUND OF THE INVENTION

1. Field of the Invention

The present invention relates to load and stress prediction on aircraft structures, and in particular to fatigue spectra generation for accurately, quickly, and efficiently determining the cyclic stresses that an aircraft will be exposed to during its lifetime.

2. Related Art

An aircraft undergoes numerous stresses during its lifetime. Discrete events of the aircraft, such as air and ground maneuvers, produce numerous external loads that are applied to various parts of the airframe that cause stresses on the airframe. Therefore, due to the numerous types of maneuvers that the aircraft might undergo, the means of predicting the stress accurately for each of the discrete events is extremely important.

Fatigue spectra generation predicts the amount of stress that the aircraft will be subjected to for each event represented in a profile of events that are expected during the life of the aircraft. Current fatigue spectra generation processes rely on regression techniques. In one such example, first a multitude of balanced external load conditions have to be generated. Next, a finite element model utilizes the balanced external load conditions to obtain internal loads. Then, a best fit equation must be derived to relate the internal loads to the external load summations at key control points such as the Wing root, Horizontal root, Vertical root and select fuselage stations for every event in the profile of events that are expected during the life of the aircraft. The external load summations described above are obtained from well known aeroelastic analysis procedures. Since the external loads at key interfaces (wing root, horizontal root, etc.) are available from such an aeroelastic analysis for every event, internal loads for every event can be derived using the regression equation.

However, current regression techniques often produce inaccuracies if the regression fit is 'forced' due to the limitations in the availability of the balanced external load conditions. Also, regression techniques are time consuming since they require the generation of a regression equation for every element in the Finite element model for which a fatigue spectrum is required.

Therefore, what is needed is an accurate fatigue spectra generation process which eliminates the demand on generating fully balanced conditions for every event in the profile of events expected during the life of the aircraft. What is further needed is a fast and efficient fatigue spectra generation process which precludes the need to generate a regression equation for every member in the Finite element model of the aircraft.

Whatever the merits of the above mentioned systems and methods, they do not achieve the benefits of the present invention.

SUMMARY OF THE INVENTION

To overcome the limitations in the prior art described above, and to overcome other limitations that will become apparent upon reading and understanding the present specification, the present invention is embodied in an apparatus and method for generating fatigue spectrum on a chosen aircraft for which a Finite element model is avilable and for which a library of external load summations at key interfaces and key fundamental parameters are available from an aeroelastic analysis. The fatigue spectra generation represents a profile of stresses endured by the aircraft due to numerous events, such as ground and maneuver events, occurring during the life of the aircraft.

The ground and maneuver events of a chosen aircraft have unique external loads applied to the airframe. Each external load can be thought of being comprised of, in the simplest sense, of loads on the Wings, Horizontal tails, Vertical tail(s) and the fuselage. External loads on the Wings, Horizontal tails, Vertical Tail(s) and fuselage can be further separated into fundamental parameters which make up these loads. The fundamental parameters are the weight (commonly referred to as inertia), air loads, roll acceleration, yaw acceleration, pitch acceleration, etc. The fundamental parameters form the basis of the unit load conditions. A particular event is simulated based on the summation of all the applicable unit load conditions such as external air and internal loads on the Wings, Horizontals, Vertical(s) and the fuselage. It is important to note that the present invention attempts to produce balanced external load conditions for every event in a fatigue spectrum. The simulation applies either the entire balanced condition (obtained directly or from summing the unit loads applied to the wing, horizontal and fuselage) to a NASTRAN model to derive individual stresses or internal loads for an area of interest in the airframe. From the individual stresses, the total stress of a particular event can be determined by summing all of the derived unit individual stresses or obtained directly in the event that a totally balanced load is available. Thus, every event that the aircraft endures, i.e., the fatigue spectra, can be generated.

A feature of the present invention is the assemblage of unit loads on the Wings, Horizontals, Vertical(s) and fuselage run on a Finite Element model in an internal loads database as building blocks for generating total internal loads for all events. Another feature of the present invention is that the unit loads can be easily factored up by what is available in a ground loads library or maneuver loads library obtained from an aeroelastic analysis. Also, another feature of the present invention is that a stress or internal load can be generated on any portion of the airframe from only a handful of external unit loads run on a Finite element model. Yet another feature of the present invention is that stresses are obtained directly without having to resort to a regression analysis.

An advantage of the present invention is that for a representative block of how the airframe is going to be used, commonly referred to as the Usage tape or Event tape, the stress for each element in the Finite element model for each event in the block can be determined directly. Thus, the invention is not limited to just determining the stress of a particular element since stresses for all elements in the Finite element model are available in the database once the unit load conditions have been run on the model.

The foregoing and still further features and advantages of the present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1A:
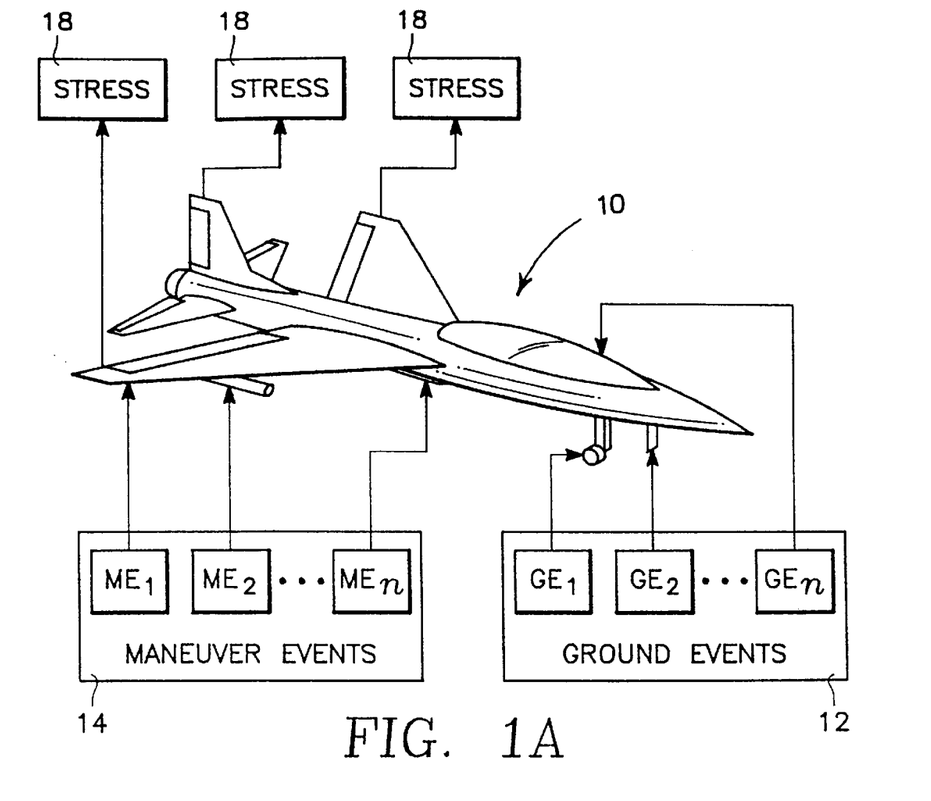
FIG. 1A is an overall view of the present invention.

Overview:

FIG. 1A is an overall view of the present invention. The present invention is a method for generating fatigue spectra on an aircraft 10. Fatigue spectra generation is a prediction of the cyclic stresses that a particular aircraft will be subjected to over a period of time (usually the life of the aircraft). Because the aircraft 10 undergoes numerous cycles of events during its lifetime, and generating complete balanced external loads for each expected event are time consuming, accurate and efficient estimates of stresses for these events are very desirable. The stresses for each event constitute the Fatigue spectrum for the aircraft.

The events can be classified into two different categories, ground events 12 and maneuver events 14. Each event category is comprised of numerous discrete events. Referring to FIG. 1A, ground events 12 are represented by $GE_1$, $GE_2$, and $GE_n$ and maneuver events 14 are represented by $ME_1$, $ME_2$, and $ME_n$.

Each discrete event of each event category causes certain external loads to be applied to the airframe which produce specific stresses on a component or an element for which the stress spectrum is desired. The stress is a result of summing stresses due the application of specific known external loads, comprised of components or unit load conditions to a Finite element model of the airframe for each discrete event. The components or unit load conditions are parameters that constitute a particular event that make a 'near balanced load external load condition'. Some example components or unit load conditions include the wing root bending moment, wing root shear, wing root torque, aircraft load factors, vertical tail root bending moment, vertical tail root shear, vertical tail root torque, horizontal tail root shear, horizontal tail bending moment, and horizontal tail torque.

For instance, the discrete maneuver event of a symmetric pull up on an aircraft produces specific external loads comprised of, among other things, root bending moments, root shears, and root torques, thereby creating a discrete pattern of stresses on the airframe. Similarly, the discrete ground event of landing the aircraft produces specific external loads comprised of, amongst other things, wing root loads, horizontal tail loads and landing gear loads, thereby creating a discrete pattern of stresses on the airframe.

Each aircraft has a given profile or Event Tape comprised of a representative block of discrete events that the aircraft typically endures over its lifetime. From the Event Tape, the service life requirements of the airframe can de determined. In other words, the Event Tape maps the use of the aircraft during its lifetime.

As an example, Table I illustrates the service life requirements for a sample aircraft per N spectrum flight hours (SFH).

TABLE 1

| EVENT | CYCLES |
| --- | --- |
| Ground-Air-Ground | $n_1$ |
| Field Taxi Runs | $n_2$ |
| Catapult Launches | $n_3$ |
| Landings: | — |
| Arrested | $n_4$ |
| Touch and Go | $n_5$ |
| Field Carrier Landing Practice | $n_6$ |
| Field Mirrored Landing Practice | $n_7$ |

From Table I, a complete Event Tape can be derived by combining the event data (maneuver event data and the ground event data) on a flight-by-flight basis. The final product is a composite spectrum which includes all fatigue design repeated load events for a simulated flight hour block.

Figure 1B:
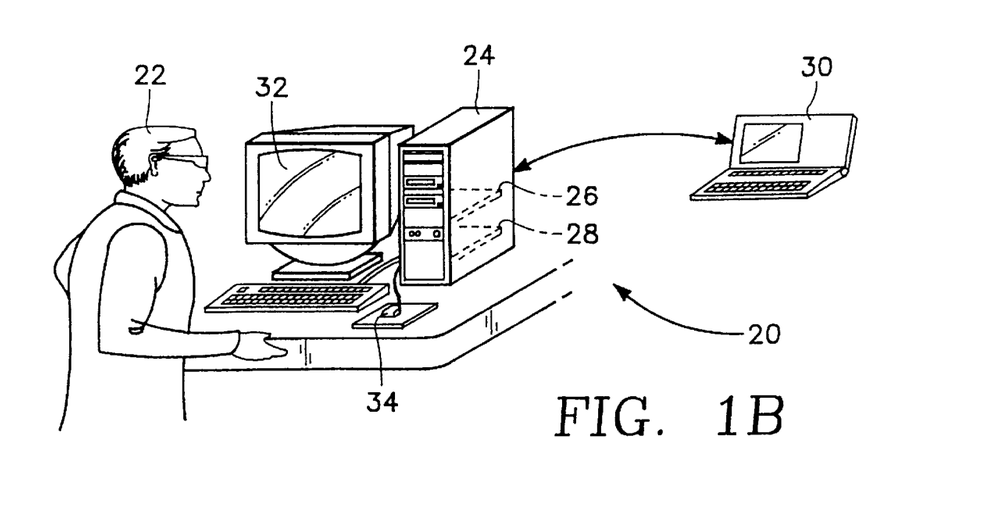
FIG. 1B is an overall diagram of the computer implemented apparatus and method of the present invention.

General Operation:

FIG. 1B is an overall diagram of the computer implemented apparatus and method of the present invention. The present invention is a fatigue spectra generation system 20 for providing a user 22, such as an operator, with an interactive computer environment 24 with a memory medium 26 and spectra generation software 28 operating on the computer 24. The spectra generation software 28 has access to and exchanges data with the memory medium 26. The fatigue spectra generation system 20 accurately, quickly, and efficiently determines the cyclic stresses that a selected aircraft will be exposed to during its lifetime.

Also, the fatigue spectra generation system 20 can further include a remote station 30 linked to the software 28 of the interactive computer 24. The remote station 30 can have additional information pertinent to fatigue spectra generation for updating and supplementing data into the memory 26 of the computer 24 in real time. Moreover, the remote station 30 can share access to and exchange data with the computer memory 26. The remote station 30 can be linked to the computer 24 in any suitable networking manner, such as via an intranet or internet connection.

The user 22 can interact with the computer 24 via a custom or standard graphical user interface 32. An input device 34, such as a mouse, trackball, or keyboard can be used to interface the user 22 with the computer 24.

Figure 2:
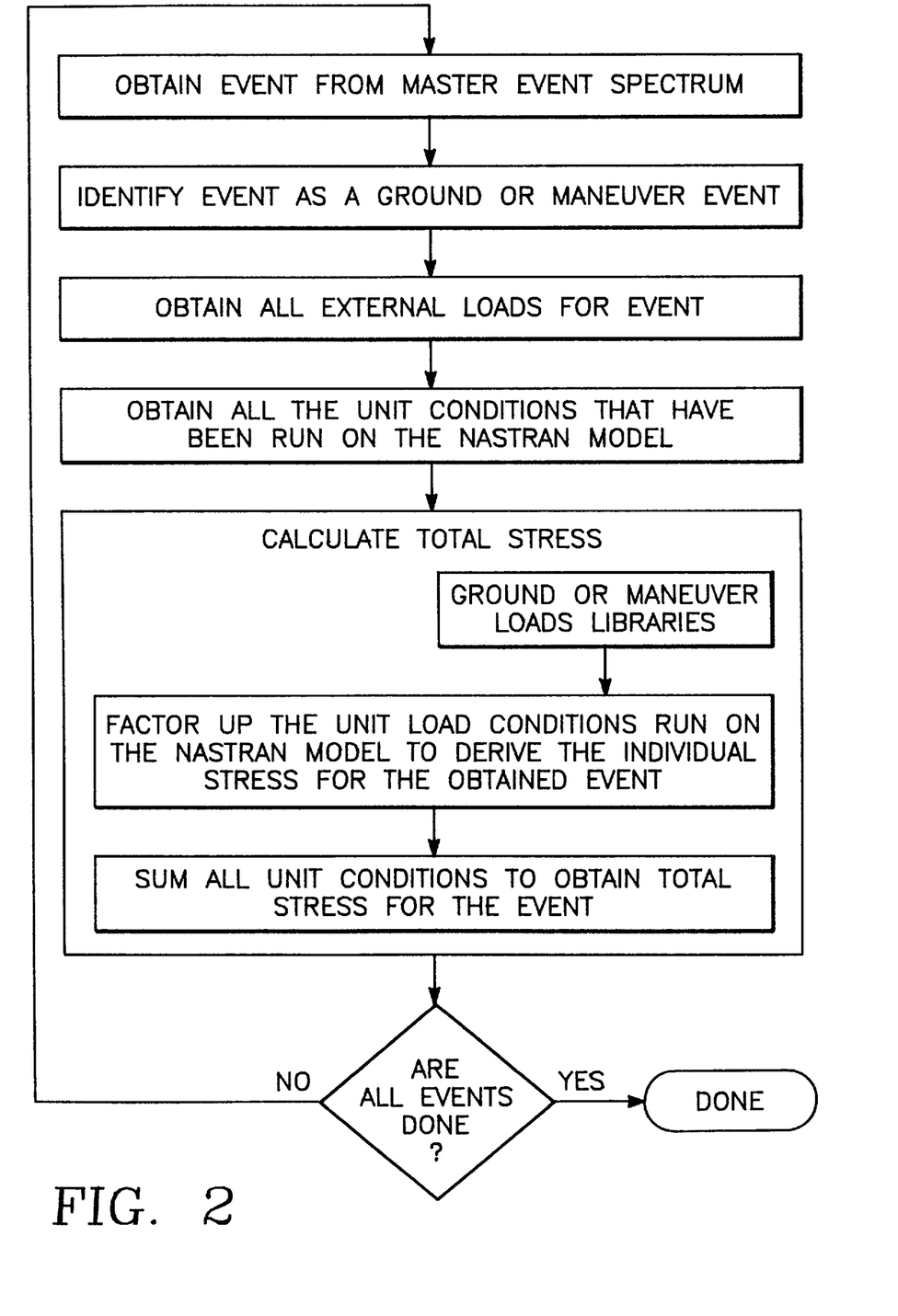
FIG. 2 is a block diagram illustrating a general model of the present invention.

FIG. 2 is an overall block diagram illustrating a general model of the present invention. Referring to FIG. 1B along with FIG. 2, the present invention utilizes a Finite element model, such as a NASTRAN model, a library of external loads at key interfaces and an Event Tape (a spectrum of stored events, such as a digital file containing a listing of a sequence of events the aircraft goes through in a representative block of a set number of flight hours) stored within the memory 26 of the computer 24 or on the remote station 30. As an illustration, an event tape as a digital file can have the following format: line 1: title; line 2: number of hours represented by the profile, number of lines defining the events (n lines); line 3 thru n: code for event 1, code for event 2, code for event n. The unit external load conditions are run on the NASTRAN model on the computer 24. The NASTRAN model's output database is stored in the memory 26 of the computer 24 and contains the internal loads for the unit conditions.

Because unit load conditions are the components of external loads acting on the airframe comprising an event, the unit load conditions are used directly from the NASTRAN model as building blocks to derive individual stresses or internal loads for every event in the Event Tape. Specifically, the individual stresses or internal loads for a particular event are derived by factoring up the unit load conditions that have been run on the NASTRAN model with consistent boundary conditions by the external load parameters available in a library from an aeroelastic analysis.

As shown in FIG. 2, first, an event is obtained from the Event Tape, such as a Master Event Spectrum. Second, the obtained event is identified as either a ground event or a maneuver event (ground events and maneuver events will be discussed in detail below in FIGS. 3–6). Third, all known external loads on major control surfaces (wings, horizontals and Vertical(s)) associated with the particular event are obtained from the maneuver or ground loads library. The maneuver loads library is a library of aircraft parameters and external loads (e.g. Wing root shear, bending and torque, Horizontal Tail shear, bending and torque, aircraft load factors, etc.) for every maneuver event in the Event Tape. Similar to the maneuver loads library, the ground loads library is a library of aircraft parameters ( e.g. loads applied to the Nose and main landing gears, aircraft load factors, aircraft roll accelerations etc.) for every ground event in the Event tape. Fourth, all unit stresses are obtained corresponding to the unit load conditions that have been run on the NASTRAN model from an Internal loads database for the element of interest. This allows the unit load conditions to be used directly as building blocks to derive the individual stresses or internal loads for the obtained event. Fifth, the total stress on the element for the obtained event is calculated by factoring and summing up all the unit load condition stresses.

The derivation of a total stress for the particular event simply involves factoring the unit load conditions by the quantities in the Maneuver or Ground loads libraries depending on the type of event and summing them up. After the total stress is determined for the particular event, the system checks if all desired events have been processed. If so, the process is done. If not, the process returns to the first step and another event is obtained from the event tape.

Figure 3:
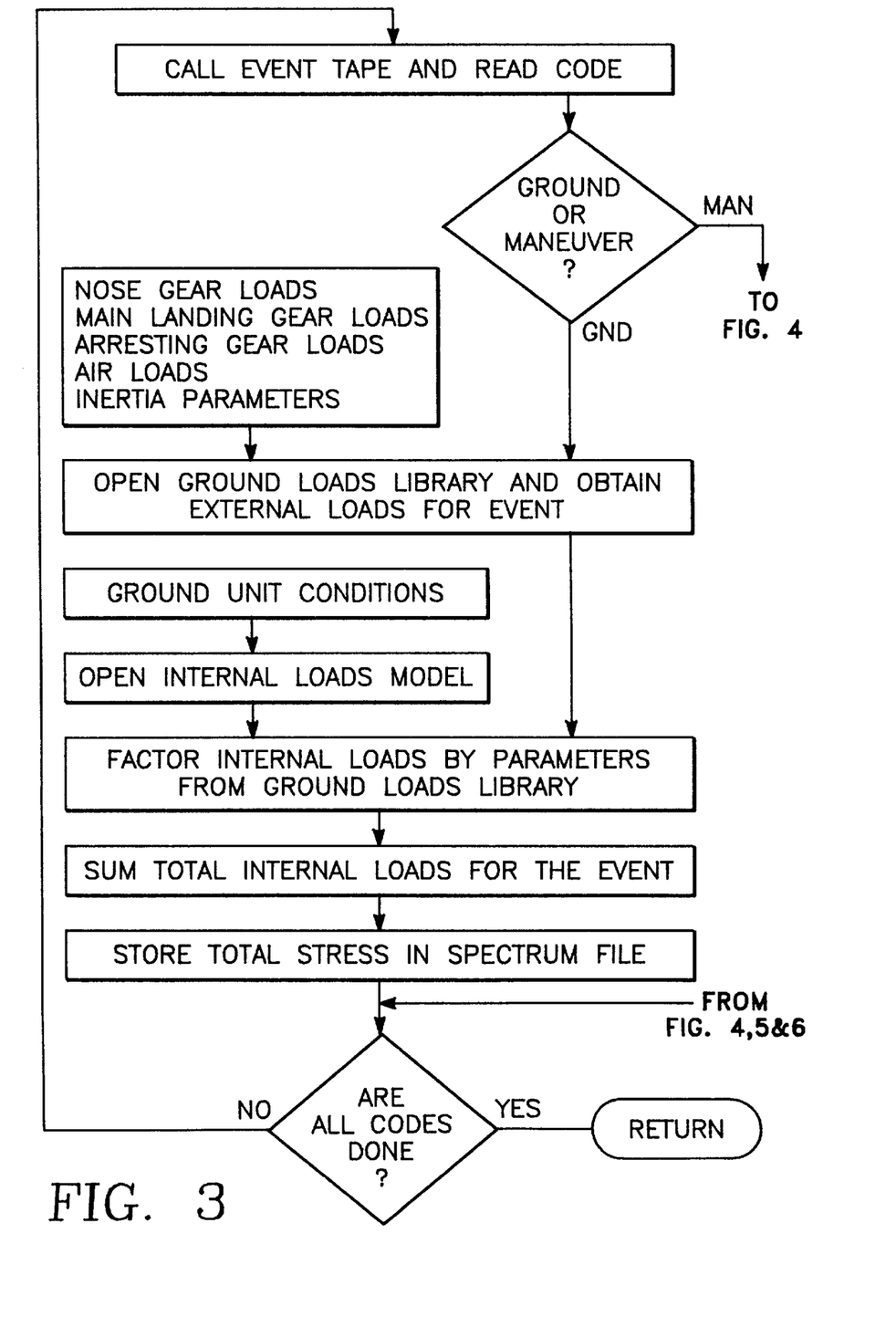
FIG. 3 is a flow chart illustrating a flow model which addresses stress calculations for ground events of the present invention.

Detailed Operation:

Ground Events:

FIG. 3 is a flow chart illustrating a flow model illustrating how ground events are calculated in the present invention. First, the event tape (Master Event Spectrum) is called in order to obtain an event from the event tape. Second, the type of event (ground or maneuver) is read. Third, it is determined whether the event is a ground or maneuver event. If it is a maneuver event, the maneuver loads library is opened (see FIG. 4) to obtain external loads for the event. If it is a ground event, fourth, the ground loads library is opened. Fifth, a database of internal loads (used interchangeably with individual stresses), such as an internal loads model, is opened to acquire the internal loads of the unit load conditions. Sixth, the internal loads are factored by parameters from the ground loads library. Seventh, the total internal load or total stress is calculated by summing up the unit stresses which constitute the event. Eighth, the total internal load or total stress is stored in a spectrum file. Last, it is determined whether all of the events have been processed. If so, the process is done. If not, the process returns to the first step and another event is obtained from the event tape. Specific calculations and examples of the factoring up and summation steps are provided below as working examples. In addition, it should be noted that the ground loads library and external loads for the events can comprise, for example, nose gear loads, main landing gear loads, arresting gear loads, air loads, inertia parameters, etc. Also, the ground unit conditions can be unit conditions comprising nose gear loads, main landing gear loads, arresting gear loads, air loads, inertia parameters, etc.

Figure 4:
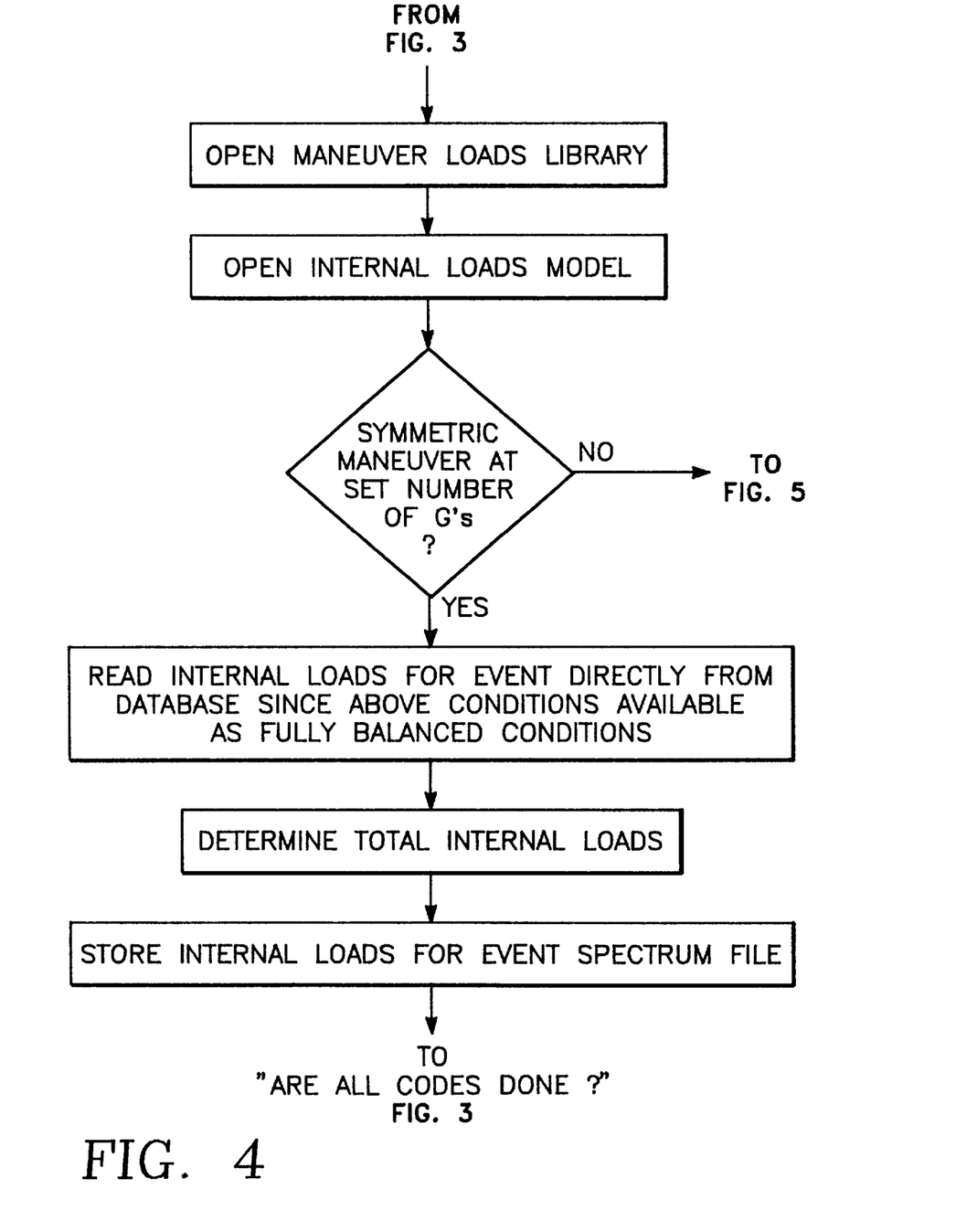
FIG. 4 is a flow chart illustrating a flow model which addresses stress calculations for specific symmetric maneuvers of the present invention.

FIG. 4 is a flow chart illustrating a flow model illustrating how symmetric maneuver events for which balanced external loads are available are calculated in the present invention. First, since the event is a maneuver event (from FIG. 3), the maneuver loads library is opened. Second, it is determined whether the maneuver is a predefined symmetric maneuver for which a complete balanced load external loads condition is available. If it is a symmetric maneuver which falls in this category, the given internal loads for the obtained event are read directly from the internal loads database. If it is not a predefined symmetric maneuver, it is determined whether the event is an asymmetric maneuver or a symmetric maneuver not included as a predefined symmetric maneuver (see FIG. 5). Fourth, the total internal load or total stress for the obtained event is determined. Fifth, the total internal load or total stress is stored in the spectrum file. Last, it is determined whether all of the events have been processed (see FIG. 3).

Figure 5:
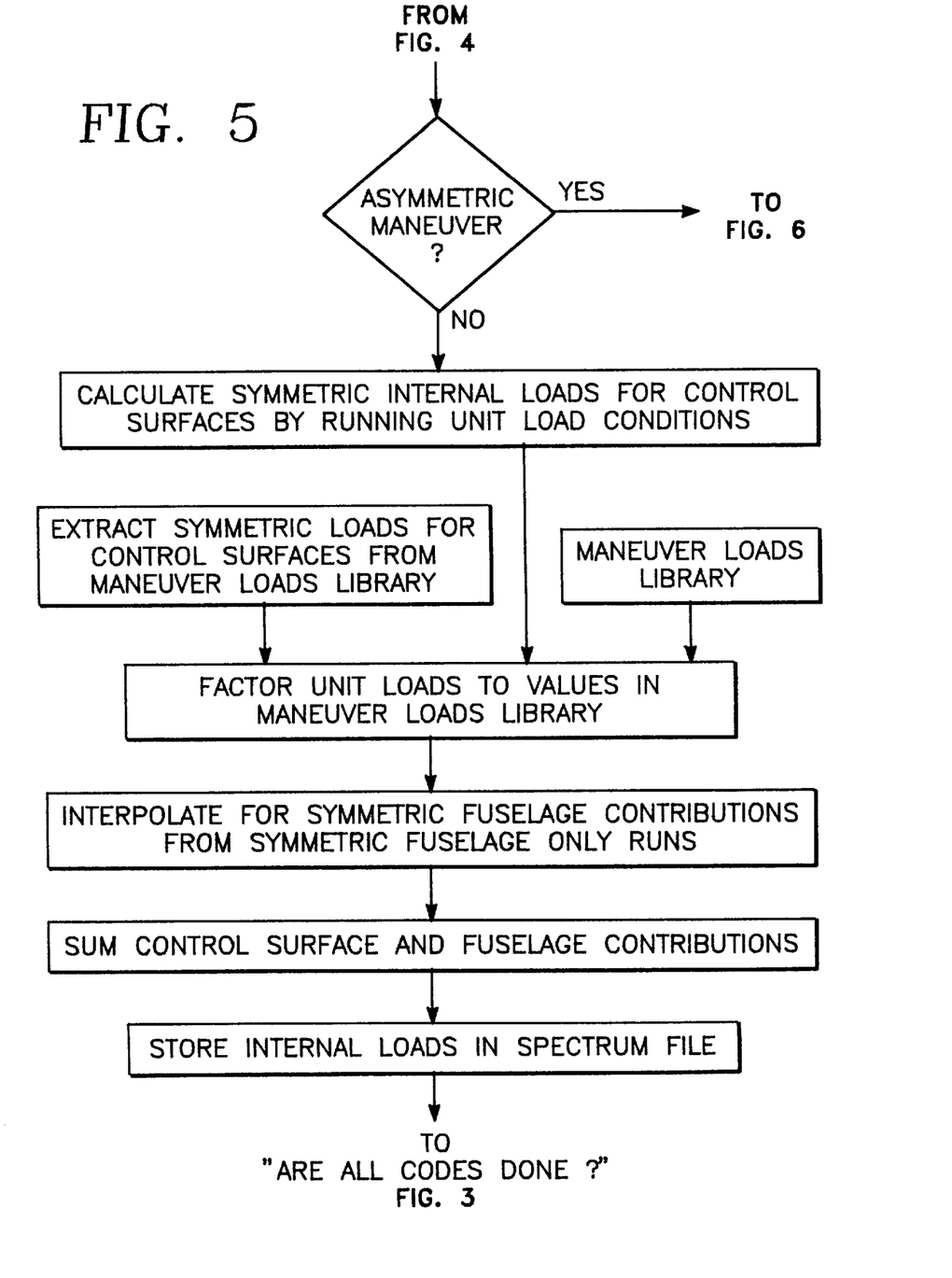
FIG. 5 is a flow chart illustrating a flow model which addresses stress calculations for general symmetric maneuvers of the present invention.

FIG. 5 is a flow chart illustrating a flow model illustrating how general symmetric maneuver events are calculated in the present invention. First, it is determined whether the event is an symmetric maneuver or not. If it is not a symmetric maneuver, the process continues with FIG. 6. If it is a symmetric maneuver, symmetric loads for control surfaces are extracted from the maneuver loads library. Symmetric external loads for the control surfaces are extracted from the maneuver loads library. Internal loads for the control surfaces are then extracted from the internal loads database from the unit load conditions run on the internal loads model. Next, the unit internal loads are factored to the values obtained from the maneuver loads library from above and stored for summation with the fuselage loads. Next, the system interpolates symmetric fuselage contribution from symmetric fuselage only runs. The symmetric fuselage only runs comprise of the balanced symmetric load conditions described above, except that loads on the control surfaces are removed leaving loads applied to the fuselage only. For example, if the balanced condition fuselage only loads were available at a set number of load factors, the fuselage only contribution for the load factor of interest is simply interpolated from the available load factors. The total internal load or total stress for the obtained event is then determined by summing the stored control surface loads from above and the interpolated fuselage contributions. Next, the total internal load or total stress is stored in a spectrum file. Last, it is determined whether all of the events have been processed (see FIG. 3).

Figure 6:
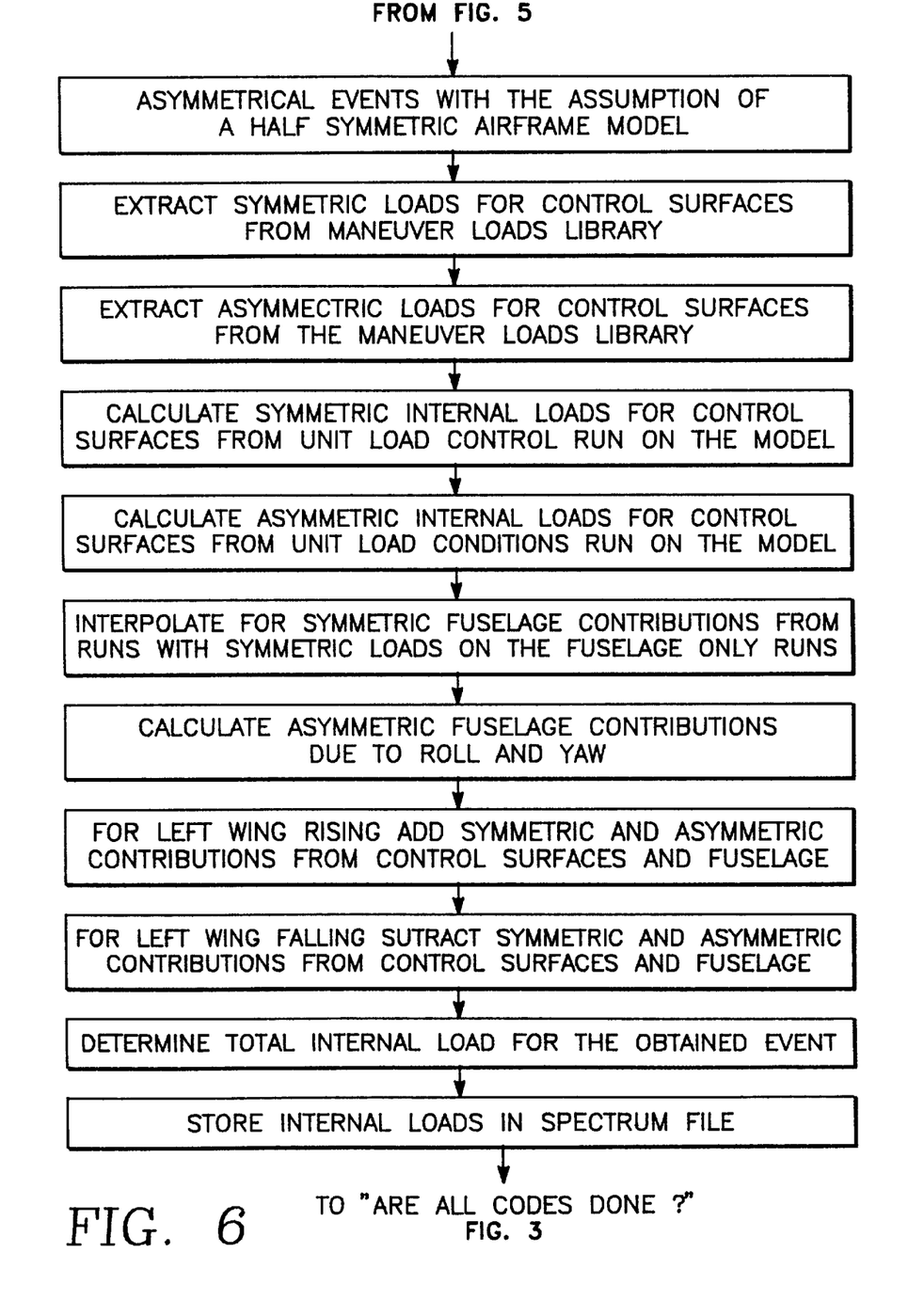
FIG. 6 is a flow chart illustrating a flow model which addresses stress calculations for asymmetric maneuvers of the present invention.

FIG. 6 is a flow chart illustrating a flow model of asymmetric maneuver activities of the present invention assuming that the airframe NASTRAN model is a half model with symmetric and asymmetric boundary conditions. First, symmetric loads for control surfaces are extracted from the maneuver loads library. Second, asymmetric loads for control surfaces are extracted from the maneuver loads library. Third, symmetric internal loads for the control surfaces are calculated by running unit load conditions for the obtained event on the internal loads model. Fourth, asymmetric internal loads for the control surfaces are calculated by running unit load conditions for the obtained event on the internal loads model. Fifth, the system interpolates symmetric fuselage contributions from symmetric fuselage only runs. Sixth, asymmetric fuselage contributions due to roll and yaw are calculated. Seventh, for left wing rising, symmetric and asymmetric contributions are added from control surfaces and fuselage. Eighth, for left wing falling, symmetric and asymmetric contributions are subtracted from control surfaces and fuselage. Ninth, the total internal load or total stress for the obtained event is determined. Tenth, the total internal load or total stress is stored in a spectrum file. Last, it is determined whether all of the events have been processed (see FIG. 3).

Working Examples:

The following are working examples, with working parameters, of the computer implemented system and method for fatigue spectra generation of the present invention. It should be noted that the below examples are for illustrative purposes only, and that the below examples merely represent sample cases and the invention is not limited to these examples. Referring to FIGS. 1–6, the below working examples provide setup, processing, and data parameters for generating sample fatigue spectra for either symmetrical or asymmetrical maneuvers and for ground events.

MANEURS:

Symmetrical Maneuvers

For symmetrical maneuvers of the present working example, the following setup/structure for generating loads/stresses for a symmetrical event was used:

1. NASTRAN output for balanced Fatigue conditions selected at load factors (G's)
2. Symmetric Maneuver loads library (aeroelastic analysis).
3. NASTRAN output for the balanced the Fatigue conditions with loads on the Fuselage only.
4. NASTRAN output for loads applied to the Wing only for 3 static or Fatigue conditions with symmetric boundary conditions. These conditions should be chosen such that the Critical Point (C.P.) excursions on the Wing for all Static and Fatigue conditions are enveloped by these 3 'unit' conditions on the Wing.
5. NASTRAN output for loads applied to the Vertical only for 3 static or Fatigue conditions with symmetric boundary conditions. These conditions should be chosen such that the C.P. excursions on the Vertical for all static and fatigue conditions are enveloped by these 3 'unit' conditions on the Vertical.
6. NASTRAN output for a unit shear, unit Bending Moment and unit Torque on the Horizontal Tail/Fuselage interface for a statically determinate attachment of the Horizontal with the fuselage. For an indeterminate attachment the procedure is exactly the same as the Wing or Vertical.

Symmetric Maneuvers at Preselected Load Factors

For an event at the preselected load factors the stress/load on any element in the NASTRAN Model is simply obtained from the NASTRAN output from the balanced fatigue conditions at the respective load factors.

Symmetric Pullups, Pushovers at Other Load Factors, Abrupt and Speed Brake Events The stresses for these events is obtained by linearly superimposing scaled 'unit' stresses from the Wing, Vertical and Horizontal and adding an interpolated Fuselage stress for the event load factor. The 'unit' stresses for the Wing and Vertical are obtained by running the selected conditions as a part of the overall subcase structure in NASTRAN. The scaling is performed as follows:

Three conditions are selected which envelope the C.P. excursions on the control surface and document the External load summations at a reference point which coincides with the External loads reference point in the Maneuver loads library. The example shown is for the Wing but the procedure is the same for the Vertical.

|  | BM | TQ | SH |
| --- | --- | --- | --- |
| Condition 1: | bm1 | tq1 | sh1 |
| Condition 2: | bm2 | tq2 | sh2 |
| Condition 3: | bm3 | tq3 | sh3 |

A relationship can now be set up 3 unit loads denoted by P1, P2 and P3 to produce the BM, TQ and SH at the root reference point.

$$\begin{vmatrix} BM \\ TQ \\ SH \end{vmatrix} = \begin{vmatrix} a1 & a2 & a3 \\ b1 & b2 & b3 \\ 1 & 1 & 1 \end{vmatrix} \begin{vmatrix} P1 \\ P2 \\ P3 \end{vmatrix} \quad [A]$$

a1,a2,a3,b1,b2,b3 are simply the C.P. Locations of the select conditions Inversion of Matrix A yields $$\begin{vmatrix} P1 \\ P2 \\ P3 \end{vmatrix} = \begin{vmatrix} a11 & a22 & a33 \\ b11 & b22 & b33 \\ c11 & c22 & c33 \end{vmatrix} \begin{vmatrix} BM \\ TQ \\ SH \end{vmatrix} \quad [B]$$

P1., P2 and P3 can now be regarded as Units for scaling the unit stresses for any applied BM, TQ and SH on the wing. For example the stress, $\delta$ w, due to Wing loads for a 5.5 g maneuver at the Critical Point in the sky 1 is :

$\delta w = (P1/V1)*\delta cond1*BM1(5.5G)+(P2/V2)*\delta cond2*TQ1 (5.5G)+(P3/V3)*\delta cond3*SH1(5.5G)$ where BM1, TQ1 AND SH1 are the Wing bending moment, Torque and Shear at 5.5 g for critical point in the sky 1 obtained directly from the Maneuver loads library and V1, V2 and V3 are the Wing root shears for the select conditions.

The same procedure is carried out on the Vertical, and the stress, $\delta$ v, due to the Vertical Tail loads is computed using influence coefficients off the Vertical Tail matrix depicted below:

$$\begin{vmatrix} P1V \\ P2V \\ P4V \end{vmatrix} = \begin{vmatrix} V1 & V2 & V3 \\ V4 & V5 & V6 \\ V7 & V8 & V9 \end{vmatrix} \begin{vmatrix} BMV \\ TQV \\ SH \end{vmatrix}$$

Correspondingly, the stress, $\delta$ v, due to Vertical Tail loads for a 5.5 g maneuver at the Critical Point in the sky 1 is:

$\delta v = (P1V/V1)*\delta cond1*BM1(5.5G)+(P2V/V2)*\delta cond2*TQ1(5.5G)+(P3/V3)*\delta cond3*SH1(5.5G)$ where V1, V2 and V3 are the shears at the Vertical Tail root corresponding to the three unit conditions selected to envelope the C.P. variation on the Tail.

If the Horizontal/Fuselage interface is statically determinate, the stress contribution from the Horizontal is simply obtained by scaling unit shear, Bending Moment and torque cases applied to the interface by the actual Shear, Bending Moment and Torque for the event.

If the unit stresses for the Horizontal Tail shear, Bending Moment and Torque are $\delta$ hsi, $\delta$ hbi and $\delta$ hti respectively, the stress due to the Horizontal Tail loads for this event is simply $$\delta h = \delta hsi*Sh + \delta hbi*Bh + \delta hti*Th$$

where Sh, Bh and Th are the Horizontal shear, bending Moment and Torque for this event.

The Fuselage contribution for this event (5.5 g) is obtained by interpolation between the selected load factors from NASTRAN runs with loads on the Fuselage only for the event point in the sky (point in the sky 1). Let the Fuselage contribution be denoted by δf.

All contributions are now summed, hence the term building block, to produce the stress at any location on the Airframe.

$$\delta e = \delta w + \delta v + \delta h + \delta f$$

Asymmetrical Events

The equations for generating asymmetric roll maneuvers are shown below. For asymmetrical events of the working example, the following setup/structure for generating loads/stresses for each type of asymmetrical event was used:

1. NASTRAN output for balanced Fatigue conditions at select load factors.
2. Asymmetric Maneuver loads library.
3. NASTRAN output for the balanced Fatigue conditions with loads on the Fuselage only.
4. NASTRAN output for loads applied to the Wing only for 3 static or Fatigue conditions with symmetric and asymmetric boundary conditions. These conditions are chosen such that the C.P. excursions on the Wing for all Static and Fatigue conditions are enveloped by these 3 conditions.
5. NASTRAN output for loads applied to the Vertical only for 3 static or Fatigue conditions with symmetric and asymmetric boundary conditions. These conditions should be so chosen such that the C.P. excursions on the Vertical for all static and fatigue conditions are enveloped by these 3 'unit' conditions on the Vertical.
6. NASTRAN output for a unit shear, unit Bending Moment and unit Torque on the Horizontal Tail/Fuselage interface.
7. NASTRAN output for unit lateral acceleration with loads on the Fuselage only.
8. NASTRAN output for unit Roll acceleration with loads on the Fuselage only.
9. NASTRAN output for unit Roll velocity with loads on the Fuselage only.
10. NASTRAN output for unit Yaw velocity with loads on the Fuselage only.
11. NASTRAN output for unit lateral loads applied to the Fuselage to balance asymmetric lateral loads on the Vertical Tail.

The procedure, illustrated below for a 5.5 g rising wing event for point in the sky 1, is similar to that described for the symmetrical events except that loads on the Control surfaces (Wing, Horizontal and Vertical) are broken into their symmetric and asymmetric components. This is necessary since a half model of the total airframe model is used. First, left and right hand side loads are extracted on the Control surfaces from the Maneuver loads library for the 5.5 g roll event with the following definitions.

| | |
|---|---|
| Left Wing Shear = lwS | Right Wing Shear = rws |
| Left Wing Bending moment = lwb | Right Wing Bending moment = rwb |
| Left Wing Torque = lwt | Right Wing Torque = rwt |
| Left Horizontal Shear = lhs | Right Horizontal Shear = rhs |
| Left Horizontal Bending moment = lhb | Right Horizontal Bending momemt = rhb |
| Left Horizontal Torque = lht | Right Horizontal Torque = rht |

-continued

| | |
|---|---|
| Left Vertical Shear = lvs | Right Vertical Shear = rvs |
| Left Vertical Bending moment = lvb | Right Vertical Bending momemt = rvb |
| Left Vertical Torque = lvt | Right Vertical Torque = rvt |

The symmetric and asymmetric components are calculated from the left and right hand side loads using:

sym component=(left+right)/2 asym component=(left−right)/2

The above applies to the Wing and the Horizontal but for the Vertical Tail the convention used is sym component=(left−right)/2 asym component=(left+right)/2 due to the sign convention used for defining positive directions of loads on the left and right Tails.

The symmetric and asymmetric loads can now be defined as:

| | |
|---|---|
| Sym Wing shear = sws | Asym Wing shear = aws |
| Sym Wing Bending moment = swb | Asym Wing Bending moment = awb |
| Sym Wing Torque = swt | Asym Wing Torque = awt |
| Sym Horizontal shear = shs | Asym Horizontal shear = ahs |
| Sym Horizontal Bending moment = shb | Asym Horizontal Bending moment = ahb |
| Sym Horizontal Torque = sht | Asym Horizontal Torque = aht |
| Sym Vertical shear = svs | Asym Vertical shear avs |
| Sym Vertical Bending moment = svb | Asym Vertical Bending moment = avb |
| Sym Vertical Torque = svt | Asym Vertical Torque = avt |

Second, the 'Unit solution' approach is now used to calculate the influence of loads on each of the control surfaces on the location of interest in the airframe. The procedure is shown for the Wing but the procedure is identical for the Vertical and Horizontal. Using the Wing Influence coefficient matrix from the symmetrical maneuver section, the influence coefficients for the symmetric loads on the Wing are:

$$\begin{vmatrix} P1s \\ P2s \\ P3s \end{vmatrix} = \begin{vmatrix} a11 & a22 & a33 \\ b11 & b22 & b33 \\ c11 & c22 & c33 \end{vmatrix} \begin{vmatrix} swb \\ swt \\ sws \end{vmatrix}$$

where the 3 unit conditions that envelope the C.P. excursions on the Wing are applied to the Model using Symmetric Centerline boundary conditions.

The influence coefficients for asymmetric loads on the Wing are:

$$\begin{vmatrix} P1a \\ P2a \\ P3a \end{vmatrix} = \begin{vmatrix} a11 & a22 & a33 \\ b11 & b22 & b33 \\ c11 & c22 & c33 \end{vmatrix} \begin{vmatrix} awb \\ awt \\ aws \end{vmatrix}$$

where the 3 unit conditions that envelope the C.P. excursions on the Wing are applied to the Model using Asymmetric Centerline boundary conditions.

The symmetric influence from the Wing for the location of interest is:

$$\delta wsym = (P1s/V1)*\delta cond1*swb + (P2s/V2)*\delta cond2*swt + (P3s/V3)*\delta cond3*sws$$

and the asymmetric influence is:

$$\delta w\,asym = (P1a/V1)*\delta cond1*awb + (P2a/v2)*\delta cond2*awt + (P3a/V3)*\delta cond3*aws$$

The total stress contribution from the Wing for the location of interest is therefore $\delta w$ total left=$\delta w$ sym+$\delta w$ asym and the corresponding location on the other side of the aircraft (the right hand side) is $\delta w$ total right=$\delta w$ sym−$\delta w$ asym Stresses due to symmetric and asymmetric loads on the Horizontal and Vertical are obtained by the same procedure as shown for the Wing but by using the Influence coefficient matrices for the Horizontal and Vertical respectively. If the stress contributions from the Vertical and Horizontal are denoted by $\delta v$ sym, $\delta v$ asym, $\delta h$ sym and $\delta h$ asym, the total stress contribution at the location of interest from the Control surfaces is:

$\delta$total left=$\delta w$ sym+$\delta v$ sym+$\delta h$ sym+$\delta w$ asym+$\delta v$ asym+$\delta h$ asym $\delta$total right=$\delta w$ sym+$\delta v$ sym+$\delta h$ sym−($\delta w$ asym+$\delta v$ asym+$\delta h$ asym)

Fuselage Contribution

Last, the symmetric Fuselage contribution for this event (5.5 g) is obtained by interpolation from NASTRAN runs with loads on the Fuselage only. Since the unit stresses due to the roll velocity and yaw velocity unit cases are also available, the stress contribution due to the square of these terms is added to the interpolated stress by reading the parameters from the Maneuver loads library, squaring them and multiplying the squared terms by the unit cases. The total symmetric fuselage contribution is therefore:

$$\delta fs = \delta int + \delta unit\theta *(\theta)*(\theta) + \delta unit\psi *(\psi)*(\psi)$$

where $\delta int$=Interpolated stress $\delta unit\ \theta$=Unit stress for unit roll velocity $\delta unit\ \psi$=Unit stress for unit yaw velocity $\theta$=Roll velocity for the event from the Maneuver loads library $\psi$=Yaw velocity for the event from the Maneuver loads library The asymmetric Fuselage airload contribution is assumed to be small and all asymmetric loads are assumed to be reacted by Fuselage Inertia. The unit NASTRAN conditions for loads applied to the fuselage only for lateral acceleration and roll acceleration are utilized to calculate the asymmetric Fuselage contribution. The acceleration parameters are available from the Maneuver loads library and the contribution is simply calculated by factoring the unit NASTRAN conditions by the parameters read from the library. The asymmetric fuselage contribution is therefore:

$$\delta fa = \delta unit\ Ny*(Ny) + \delta unit\ \ddot{a}*(\ddot{a}) + \delta unit\ \ddot{e}*(\ddot{e})$$

where $\delta unit\ Ny$=Unit stress for lateral acceleration $\delta unit\ \ddot{a}$=Unit stress for unit roll acceleration $\delta unit\ \ddot{e}$=Unit stress for unit yaw acceleration $\ddot{a}$=Roll acceleration for the event from the Maneuver loads library $\ddot{e}$=Yaw acceleration for the event from the Maneuver loads library Ny=Lateral acceleration for the event from the Maneuver loads library The only asymmetric load that remains unaccounted for is the load that is required on the Fuselage to balance the lateral shear on the Vertical Tail. Use is made of the Unit NASTRAN condition for unit lateral loads applied to the Fuselage to balance asymmetric lateral loads on the Vertical Tail. This condition is simply factored by the lateral asymmetric lateral shear on the Vertical Tail (avs) and the stress contribution $\delta avs$ added to the asymmetric fuselage contribution. The total asymmetric fuselage contribution is therefore:

$$\delta fa = \delta fa + \delta avs$$

For the location of interest, the stress, by the building block approach, is the sum of the components calculated above.

$\delta t$ left=$\delta w$ sym+$\delta v$ sym+$\delta h$ sym+$\delta w$ asym+$\delta v$ asym+$\delta h$ asym+$\delta fa$ $\delta t$ right=$\delta w$ sym+$\delta v$ sym+$\delta h$ sym−($\delta w$ asym+$\delta v$ asym+$\delta h$ asym+$\delta fa$)

GROUND EVENTS

Stresses for a ground events are calculated using a true building block approach, since the load condition for a particular type of event is generated from its very basic ingredients. NASTRAN unit conditions are generated for the entire airframe for the basic ingredients listed below and simply factored by the same ingredients available in the Ground loads libraries.

For the ground events working example, the following setup/structure was used:

1. Ground Loads library
2. NASTRAN stress for unit lateral acceleration (4 mass distributions)−$\delta la$
3. NASTRAN stress for unit axial acceleration (4 mass distributions)−$\delta aa$
4. NASTRAN stress for unit vertical acceleration (4 mass distributions)−$\delta va$
5. NASTRAN stress for unit roll velocity squared 4 mass distributions)−$\delta rv$
6. NASTRAN stress for unit pitch velocity squared (4 mass distributions)−$\delta pv$
7. NASTRAN stress for unit yaw velocity squared (4 mass distributions)−$\delta yv$
8. NASTRAN stress for unit Roll acceleration (4 mass distributions)−$\delta ra$
9. NASTRAN stress for unit Pitch acceleration (4 mass distributions)−$\delta pa$
10. NASTRAN stress for unit Yaw acceleration (4 mass distributions)−$\delta ya$
11. NASTRAN stress for unit cross product of Roll velocity and Pitch velocity (4 mass distributions)−$\delta rp$
12. NASTRAN stress for unit cross product of Pitch velocity and Yaw velocity (4 mass distributions)−$\delta py$
13. NASTRAN stress for unit cross product of Roll velocity and Yaw velocity (4 mass distributions)−$\delta ry$
14. NASTRAN stress for unit dynamic pressure * angle of attack−$\delta da$
15. NASTRAN stress for unit dynamic pressure * stabilator deflection−$\delta ds$
16. NASTRAN stress for unit dynamic pressure * yaw angle−$\delta dy$
17. NASTRAN stress for unit dynamic pressure * rudder deflection−$\delta dr$
18. NASTRAN stress for unit dynamic pressure * roll angle−$\delta dra$
19. NASTRAN stress for unit drag load distribution−$\delta drag$
20. NASTRAN stress for unit drag force on the Nose landing gear left trunnion−$\delta ld$
21. NASTRAN stress for unit side force on the Nose landing gear left trunnion−$\delta nls$
22. NASTRAN stress for unit vertical force on the Nose landing gear left trunnion−$\delta nlv$ 23. NASTRAN stress for unit drag force on the Nose drag brace left trunnion–δdla
24. NASTRAN stress for unit side force on the Nose drag brace left trunnion–δndls
25. NASTRAN stress for unit vertical force on the Nose drag brace left trunnion–δndlv
26. NASTRAN stress for unit drag force on the Nose drag brace right trunnion–δndra
27. NASTRAN stress for unit side force on the Nose drag brace right trunnion–δndrs
28. NASTRAN stress for unit vertical force on the Nose drag brace right trunnion–δndrv
29. NASTRAN stress for unit axial force in the Nose landing gear retract actuator–δnrt
30. NASTRAN stress for unit lateral acceleration on right Nose Drag brace trunnion–δndrfs
31. NASTRAN stress for unit axial acceleration on right Nose Drag brace trunnion–δndrfa
32. NASTRAN stress for unit vertical acceleration on right Nose Drag brace trunnion–δndrfv
33. NASTRAN stress for unit lateral acceleration on left Nose Drag brace trunnion–δndlfs
34. NASTRAN stress for unit axial acceleration on left Nose Drag brace trunnion–δndlfa
35. NASTRAN stress for unit vertical acceleration on left Nose Drag brace trunnion–δndlfv
36. NASTRAN stress for unit lateral acceleration on right Nose Gear trunnion–δngrfs
37. NASTRAN stress for unit axial acceleration on right Nose Gear trunnion–δngrfa
38. NASTRAN stress for unit vertical acceleration on right Nose Gear trunnion–δngrfv
39. NASTRAN stress for unit lateral acceleration on left Nose Gear trunnion–δnglfs
40. NASTRAN stress for unit axial acceleration on left Nose Gear trunnion–δnglfa
41. NASTRAN stress for unit vertical acceleration on left Nose Gear trunnion–δnglfv
42. NASTRAN stress for unit vertical acceleration on Nose–δnv
43. NASTRAN stress for unit pitch acceleration on Nose–δnq
44. NASTRAN stress for unit drag force on the Main landing gear forward trunnion–δmgfta
45. NASTRAN stress for unit side force on the Main landing gear forward trunnion–δmgfts
46. NASTRAN stress for unit vertical force on the Main landing gear forward trunnion.–δmgfty
47. NASTRAN stress for unit drag and side force on the Main landing gear aft trunnion (axial load in a local coordinate system).–δmgat
48. NASTRAN stress for unit vertical force on the Main landing gear aft trunnion n.–δmgatv
49. NASTRAN stress for unit side brace axial force on the Main landing gear.–δmgsba
50. NASTRAN stress for unit axial force in the Main landing gear retract actuator.–δmgra
51. NASTRAN stress for unit drag force on the Arresting Gear pivot.–δad
52. NASTRAN stress for unit side force on the Arresting Gear pivot.–δas
53. NASTRAN stress for unit vertical force on the Arresting Gear pivot.–δav
54. NASTRAN stress for unit roll moment on the Arresting Gear pivot.–δarm
55. NASTRAN stress for unit yaw moment on the Arresting Gear pivot.–δaym
56. NASTRAN stress for unit drag force on the Arresting Gear damper.–δadd
57. NASTRAN stress for unit vertical force on the Arresting Gear damper.–δadv
58. NASTRAN stress for unit drag force on the Inboard Engine Mount–δeid
59. NASTRAN stress for unit side force on the Inboard Engine Mount.–δeis
60. NASTRAN stress for unit vertical force on the Inboard Engine Mount.–δeiv
61. NASTRAN stress for unit drag force on the Outboard Engine Mount–δeod
62. NASTRAN stress for unit vertical force on the Outboard Engine Mount.–δeov
63. NASTRAN stress for unit vertical force on the Aft Link–δeav The stress for a Ground event, δelem, is generated by using each of the unit stresses above and factoring the units by the corresponding quantities available in the Ground loads library. For ease of understanding, only a partial equation is shown below. In the partial equation shown below, the δ's simply correspond to the unit stresses and the F's to the quantities in the Ground loads library.

$$\begin{aligned}\delta\,elem = &\ \delta la * Fla + \delta aa * Faa + \delta va * Fva + \delta rv * Frv + \delta pv * Fpv + \\ & \delta yv * Fyv + \delta ra * Fra + \delta pa * Fpa + \delta ya * Fya + \delta rp * Frp + \\ & \delta py * Fpy + \delta ry * Fry + \delta da * Fda + \delta ds * Fds + \delta dy * Fdy + \\ & \delta dr * Fdr + \delta dra * Fdra + \delta drag * Fdrag + \delta nld * Fnld + \\ & \delta nls * Fnls + \delta nlv * Fnlv + \delta ndla * \delta ndls * Fndls + \delta ndlv * Fndlv + \\ & \delta ndra * Fndra + \delta ndrs * Fndrs + \delta ndrv * Fndrv + \delta nrt * Fnrt + \\ & \delta ndrfs * Fndrfs + \delta ndrfa * Fndrfa + \delta ndrfv * Fndrv + \ldots + \\ & \delta add * Fadd + \ldots \ \delta eod * Feod + \delta eov * Feov + \delta eav * Feav\end{aligned}$$

The foregoing description of the preferred embodiment and the working examples of the invention have been presented for the purposes of illustration and description. They are not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An evaluation system for generating fatigue spectra representing a predicted amount of stress that an aircraft will be subjected to for each of a plurality of events that are expected to occur during the life of the aircraft, the evaluation system comprising:

a host computer having a digitally readable medium, wherein digital data representing the expected events and aircraft load and unit condition parameters corresponding thereto reside on said digitally readable medium;

a generator operating on said computer and having access to said digital data for generating fatigue spectra of the aircraft representing a profile of predicted stresses to which the aircraft will be subjected due to the plurality of events expected to occur during the life of the aircraft; and wherein said generator is preprogrammed to calculate a total stress for each of the events based on said load and unit condition parameters associated therewith by factoring said unit condition parameters to derive individual stresses and summing all the individual stresses.

2. The evaluation system of claim 1, wherein said events are at least one of ground events and maneuver events.

3. The evaluation system of claim 1, wherein said loads are at least one of internal loads and external loads.

4. The evaluation system of claim 1, wherein said digital data is an event tape.

5. The evaluation system of claim 1, further comprising a remote computer system coupled to said host computer.

6. The evaluation system of claim 1, wherein said event tape is comprised of a spectrum of stored events including a sequence of given events that said aircraft endures in a representative block of a set number of flight hours.

7. The evaluation system of claim 1, further comprising a graphical user interface coupled to said computer for interfacing a user with said computer.

8. The evaluation system of claim 2, wherein said maneuver events comprise symmetric maneuvers and asymmetric maneuvers.

9. A computer-readable medium for causing a computer to function as a fatigue spectra generation system which predicts an amount of stress that an aircraft will be subjected to for each of a plurality of events that are expected to occur during the life of the aircraft, the medium comprising:

a computer-readable storage medium having digital data representing the expected events and aircraft load and unit condition parameters corresponding thereto; and a computer program stored on said medium and including a generator having access to the digital data stored on said computer-readable medium and operative to generate fatigue spectra of an aircraft representing a profile of predicted stresses to which said aircraft will be subjected due to the plurality of events expected to occur during the life of said aircraft;

wherein said generator is preprogrammed to calculate a total stress for each of the events based on said load and unit condition parameters associated therewith by factoring said unit condition parameters to derive individual stresses and summing all the individual stresses.

10. The evaluation system of claim 9, wherein said events are at least one of ground events and maneuver events.

11. The evaluation system of claim 9, wherein said loads are at least one of internal loads and external loads.

12. The evaluation system of claim 9, wherein said digital data is an event tape.

13. The evaluation system of claim 9, further comprising a remote computer system coupled to said host computer.

14. The evaluation system of claim 1, wherein said event tape is comprised of a spectrum of stored events.

15. The evaluation system of claim 9, further comprising a graphical user interface coupled to said computer for interfacing a user with said computer.

16. The evaluation system of claim 10, wherein said maneuver events comprise symmetric maneuvers and asymmetric maneuvers.

17. A process for generating fatigue spectra representing a predicted amount of stress that an aircraft will be subjected to during the life of the aircraft, comprising the steps of:

(a) defining data representing aircraft load and unit condition parameters of the aircraft;

(b) associating events which are expected to occur during the life of the aircraft with said data;

(c) calculating a total stress based on said load and unit condition parameters by,
  (1) factoring said unit condition parameters to derive individual stresses for each event, and
  (2) summing all the individual stresses; and (d) using said total stress to define a fatigue model representing a profile of predicted stresses to which the aircraft will be subjected due to said events which are expected to occur during the life of the aircraft.

18. The evaluation system of claim 17, wherein said events are at least one of ground events and maneuver events.

19. The process of claim 18, wherein said loads are at least one of internal loads and external loads and said maneuver events comprise symmetric maneuvers and asymmetric maneuvers.

20. The process of claim 18, wherein said data is an event tape defining how an aircraft will be used.

* * * * *

UNITED STATES PATENT AND TRADEMARK OFFICE
CERTIFICATE OF CORRECTION

PATENT NO. : 6,125,333
DATED : September 26, 2000
INVENTOR(S) : Adarsh Kumar Pun It is certified that error appears in the above-identified patent and that said Letters Patent is hereby corrected as shown below:

STATEMENT OF GOVERNMENT RIGHTS

This invention was made with Government Suport under contract N00019-92-C-0059 awarded by the United States Navy. The Government has certain rights in this invention.

Signed and Sealed this

Nineteenth Day of March, 2002

Attest:

JAMES E. ROGAN
*Attesting Officer*     *Director of the United States Patent and Trademark Office*